United States Patent
Song et al.

(10) Patent No.: US 10,269,164 B1
(45) Date of Patent: Apr. 23, 2019

(54) CREATING CUSTOM STICKERS FOR USE ON A MESSAGING SYSTEM

(71) Applicant: WhatsApp Inc., Menlo Park, CA (US)

(72) Inventors: Min Seung Song, San Jose, CA (US); Randall Sarafa, San Francisco, CA (US)

(73) Assignee: WhatsApp Inc., Menlo Park, CA (US)

( * ) Notice: Subject to any disclaimer, the term of this patent is extended or adjusted under 35 U.S.C. 154(b) by 0 days.

(21) Appl. No.: 15/993,533

(22) Filed: May 30, 2018

(51) Int. Cl.
| G06K 9/00 | (2006.01) |
| G06T 3/40 | (2006.01) |
| G06T 11/60 | (2006.01) |
| H04L 12/58 | (2006.01) |
| G06F 3/0484 | (2013.01) |

(52) U.S. Cl.
CPC .......... G06T 11/60 (2013.01); G06K 9/00228 (2013.01); G06T 3/40 (2013.01); H04L 51/04 (2013.01); H04L 51/10 (2013.01); *G06F 3/04842* (2013.01); *G06F 3/04845* (2013.01); *G06T 2210/22* (2013.01); *G06T 2210/62* (2013.01)

(58) Field of Classification Search
None
See application file for complete search history.

(56) References Cited

U.S. PATENT DOCUMENTS

| 2006/0170791 A1* | 8/2006 | Porter | G06K 9/00295 348/231.3 |
| 2013/0235044 A1* | 9/2013 | Kaleta | G06F 3/0484 345/473 |
| 2013/0287305 A1* | 10/2013 | Dhanda | G06F 17/3089 382/218 |
| 2013/0326340 A1* | 12/2013 | Woo | G06F 3/0484 715/243 |
| 2014/0098386 A1* | 4/2014 | Goade, Sr. | G06Q 30/0207 358/1.6 |
| 2015/0094106 A1* | 4/2015 | Grossman | H04W 4/12 455/466 |
| 2015/0220811 A1* | 8/2015 | George | G06Q 30/0623 705/26.61 |
| 2016/0062611 A1* | 3/2016 | Liang | G06F 3/0412 345/173 |
| 2016/0119552 A1* | 4/2016 | Oh | G06F 3/0412 348/333.06 |
| 2018/0068475 A1* | 3/2018 | Blue | G06T 11/60 |
| 2018/0336687 A1* | 11/2018 | Mudretsov | G06T 7/246 |

* cited by examiner

*Primary Examiner* — Frank S Chen
(74) *Attorney, Agent, or Firm* — Fenwick & West LLP

(57) ABSTRACT

A messaging application receives a request from a user to create a custom sticker. The messaging application identifies an image for the custom sticker. Based on the image source of the identified image, the messaging application processes the image. Processing steps may include cropping the image, adding custom content to the image, resizing the image, rotating the image, and others. The messaging application creates a custom sticker based on the processed image and locally stores the custom sticker. The custom sticker may then be accessed and selected by the user of the messaging application to transmit to other users via the messaging system.

21 Claims, 6 Drawing Sheets

CREATING CUSTOM STICKERS FOR USE ON A MESSAGING SYSTEM

BACKGROUND

This disclosure relates generally to electronic messaging, and more particularly to creating digital stickers for use on a messaging system.

Dedicated messaging applications are a common method of online communication. Users use client devices, such as smartphones, to execute the messaging applications in order to exchange messages with enterprises, groups, and other users. One feature provided by some dedicated messaging applications is the ability to send stickers. Stickers are still or animated digital graphic images used to convey emotions or messages on the messaging application. Users of the messaging system are able to access sticker libraries containing stickers created by artists, which can be selected and sent to other users of the messaging system.

However, premade and generic stickers do not always accurately convey a user's intended emotion or message. Because premade stickers on the messaging system are created to cater to a large number of users, they may fail for individual users trying to address particular events, emotions, or messages, hampering the ability to communicate accurately and effectively on the messaging system.

SUMMARY

The above and other issues are addressed by a messaging system that allows users to create and store custom stickers for use on the messaging system. The custom stickers are created from images selected by the user and processed based on several factors, including the image source and input from the user of the client device. By allowing users to customize the stickers, the messaging system ensures that users are able to accurately convey emotions and messages in a graphical format. Accordingly, communications exchanged via the messaging system are more engaging and relevant to the users of the messaging system.

A messaging application used to access the messaging system receives a request from a user of the messaging system to create a custom sticker. Based on input from the user, the messaging application identifies an image for the custom sticker. The identified image is associated with information about the image, such as the image source. The messaging application processes the identified image responsive to the image source. For example, an image taken by the back facing camera of the client device may be processed differently than an image taken by the front facing camera of the client device. The processing steps can additionally include adding custom content to the custom sticker based on user input, cropping, resizing, and rotating the image. The messaging application creates a custom sticker based on the processed image. The custom sticker is stored and can be selected by the user to be sent to other users of the messaging system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
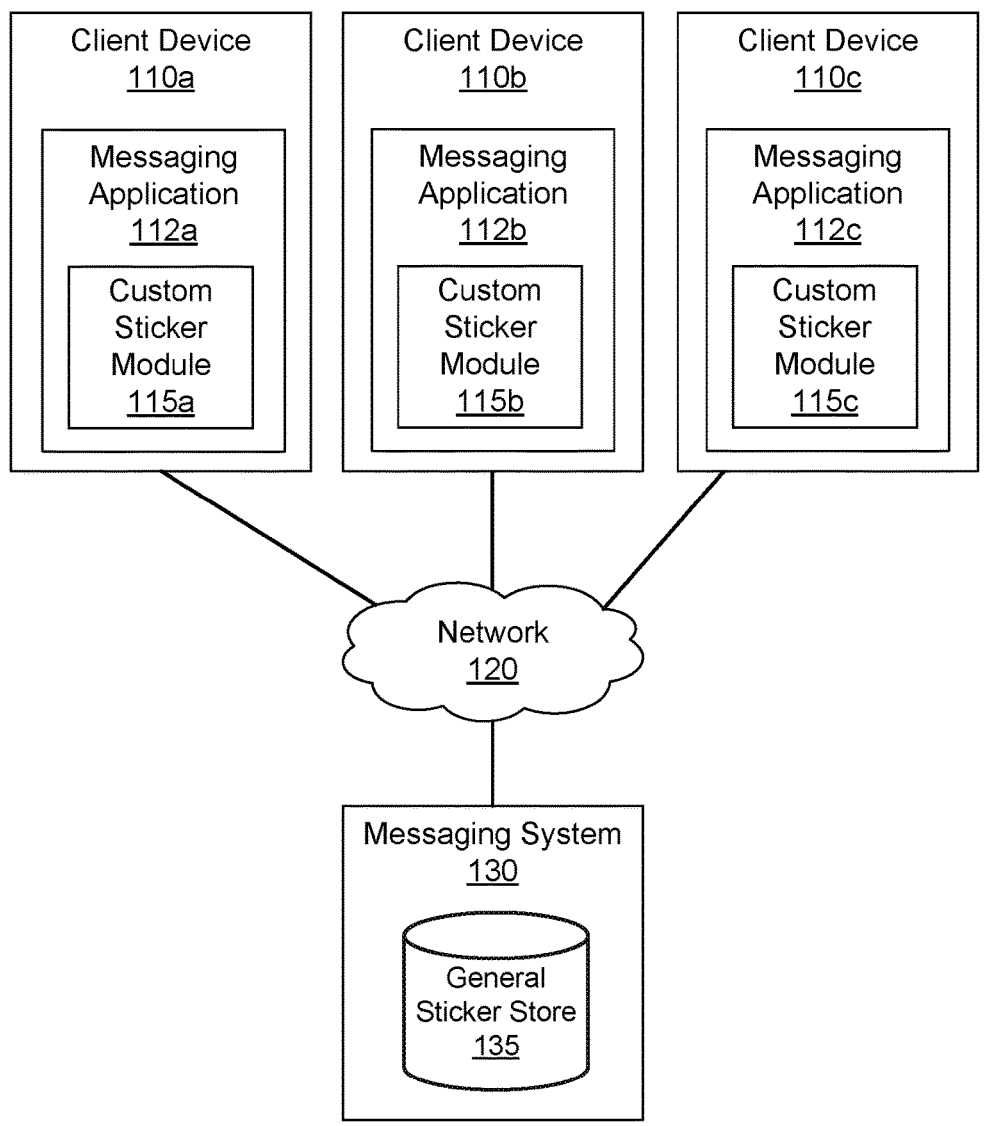
FIG. 1 is a block diagram of a system environment in which a messaging system operates, in accordance with an embodiment.

FIG. 1 is a high-level block diagram illustrating a system environment 100 including an electronic messaging system 130. The environment 100 includes multiple client devices 110 connected to the electronic messaging system 130 via a network 120. While only a few client devices 110 are shown in FIG. 1, embodiments of the environment 100 can have many such entities connected to the network 120. Other components may also be connected to the network 120.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client device 110 is a computing device that can transmit and/or receive data via the network 120. A user may use the client 110 device to perform functions such as exchanging messages using the messaging system 130, browsing websites on web servers on the network 120, consuming digital content received via the network, and executing software applications. For example, the client device 110 may be a smartphone or a tablet, notebook, or desktop computer. In addition, the client device 110 may be an Internet-of-Things (IoT)-connected device such as a home appliance. The client device 110 may include a display device on which the user may view digital content, such as messages received from the messaging system 130.

The client device 110 may execute one or more applications ("apps") that extend the functionality of the client device. The apps may include a web browser that allows the client device 110 to interact with websites provided by servers connected to the network 120. The apps may also include one or more dedicated apps for accessing the messaging system 130. In one embodiment, the user downloads and installs apps on the client device 110 for specific purposes, such as exchanging messages using the messaging system 130. Alternatively, the functionality of an app may be incorporated into an operating system of the client device 110 or included in other native functionality of the client device 110.

The messaging application 112 illustrated within the client device 110 in FIG. 1 represents an app for interacting with the messaging system 130 via the network 120. The messaging application 112 enables a user of the client device 110 to exchange messages with other client device users and with other entities. Messages exchanged between a user of the client device 110 and others may include message elements such as stickers, emojis, text, images, videos, URLs, and other forms of content. Stickers are still or animated digital graphic images used to convey emotions, actions, or other messages.

In one embodiment, the messaging application 112 contains a custom sticker module 115. The custom sticker module 115 enables a user of the messaging application 112 to create and store custom stickers. Custom stickers are created from images selected by the user and processed based on several factors, including the image source and input from the user of the client device 110. For example, custom stickers may be based on pictures taken using the camera of the client device 110, modified automatically or manually to focus on a selected subject in the image, and further edited to include custom content such as drawings, text, or other elements. In one embodiment, the custom stickers are saved locally on the messaging application 112 of the client device 110 while in other embodiments the custom stickers are stored by the messaging system 130. The custom stickers are then accessible through the messaging application 112 and may be sent by the user to other client devices 110 of the messaging system 130.

The messaging system 130 interacts with the messaging applications 112 of the client devices 110 to support the exchange of electronic messages among the users of the devices. The messaging system 130 is remote from the client devices 110 and may be implemented using one or more dedicated computers and/or a cloud computing platform. Messages exchanged by the messaging system 130 may be encrypted such that the messaging system does not have access to the content of the messages. In one embodiment, the messaging system 130 contains a general sticker store 135.

The general sticker store 135 contains stickers accessible to all users of the messaging system 130. In one embodiment, the general sticker store 135 is organized into categories of stickers. For example, the stickers can be categorized by artist, emotion or message conveyed, or frequency of use by users of the messaging system 130. Stickers in the general sticker store 135 may be accessed through messaging applications 112 and sent by users to other client devices 110. However, stickers in the general sticker store 135 cannot be modified by users of the messaging system 130, and may fail to accurately convey a user's desired emotion or message. In one embodiment, a portion of the general sticker store 135 is devoted to storing custom stickers created by users of the messaging system. Access to the custom stickers in the general sticker store 135 is restricted so that each user can access only his or her own custom stickers.

By allowing users to create and store custom stickers, the messaging system 130 ensures that users are able to accurately convey emotions and messages via the messaging system. Custom stickers created by users may be personalized or customized to a specific emotion, message, or scenario, allowing the stickers to be more engaging and relevant to users of the messaging system 130.

In one embodiment, the network 120 uses standard communications technologies and/or protocols. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 2:
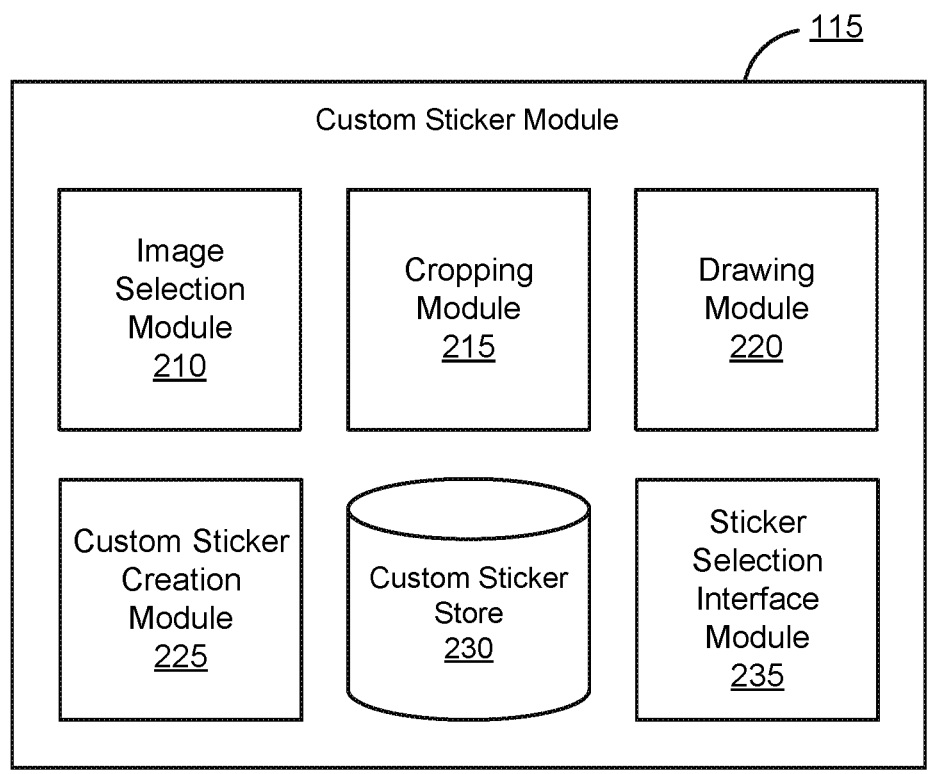
FIG. 2 is a block diagram of an architecture of the custom sticker module, in accordance with an embodiment.

FIG. 2 is a block diagram of an architecture of the custom sticker module 115. The custom sticker module 115 shown in FIG. 2 includes an image selection module 210, a cropping module 215, a drawing module 220, a custom sticker creation module 225, a custom sticker store 230, and a sticker selection interface module 235. In other embodiments, the custom sticker module 115 may include additional, fewer, or different components for various applications.

The image selection module 210 receives from the user of the messaging application 112 a selection of an image used as the base of the custom sticker. Images selected by users as custom sticker bases are associated with image sources. In one embodiment, the image sources are specified by the users at the time of selection. For example, the image selection module 210 may receive an image via a camera or a saved image store on the client device 110. In the case that the image is received from the camera on the client device 110, the image selection module 210 may further identify whether the camera is a front or back facing camera. The image selection module 210 transmits the received image to the cropping module 215 along with metadata identifying the image source.

The cropping module 215 crops the image received from the image selection module 210 to identify a subject for the custom sticker. "Cropping" refers to removing unwanted areas from the periphery of the image, thereby leaving only the subject for the custom sticker within the image. The cropping module 215 may identify the areas to crop automatically or manually based on the source of the image.

In one embodiment, if the image source is identified as the back facing camera or a saved image file, the cropping module 215 activates a manual selection mode in which it receives input from the user of the client device 110 to select a subject for the custom sticker. The cropping module 215 receives the user input by creating a cropping layer above the image received from the image selection module 210 and displaying a partially-opaque (i.e., partially-transparent) mask on the cropping layer. For example, the cropping layer may be set at 40% opacity. The cropping module 215 displays a user interface (UI) showing the image with the cropping layer, and the cropping layer causes the image to appear darkened relative to the original image. The user can then select the portion of the image representing the subject for the custom sticker using an input technique supported by the client device 110, such as by touching portions of a touch-sensitive display using a finger or stylus. The cropping module 215 changes the portions of the cropping layer located directly above the selected portions of the image to be more transparent (e.g., fully-transparent), thereby causing the selected portions of the image to appear brighter relative to the non-selected portions.

If the image source is identified as the front facing camera of the client device 110, an embodiment of the cropping module 215 activates an automatic mode that automatically applies a facial recognition process to the image to identify the subject for the custom sticker. The facial recognition process recognizes a human face contained within the image and automatically selects the area of the image containing the face as the subject for the custom sticker. The facial recognition process applied by the cropping module 215 may also select areas of the image adjacent to the recognized face, such as hair, for inclusion in the area of the image constituting the subject. The cropping module 215 displays the image to the user and uses dashed lines or other signifiers to illustrate the portions of the image automatically identified as the subject for the custom sticker. The user may then interact with the UI provided by the cropping module 215 to select the automatically-identified portions of the image.

In one embodiment, the user can interact with the UI provided by the cropping module to switch between the manual and automatic modes. That is, the user can interact with the UI to switch from the manual mode initially presented for an image sourced from a back facing camera to the automatic mode. Likewise, the user can interact with the UI to switch from the automatic mode initially presented for an image sourced from the front facing camera to the manual mode.

In either case, the cropping module 215 through user input identifies the portions of the image that constitute the subject for the custom sticker. The cropping module 215 generates cropping data that describes the portions of the image constituting the subject and stores the cropping data in association with the image. For example, the cropping data can describe the coordinates of the pixels within the image that include and/or delineate the subject.

The UI presented by the cropping module 215 includes a button or other element that the user can select to move to the next step of the custom sticker creation process. In one embodiment, the cropping module 215 disables this UI element unless a threshold minimum area of the image is identified as the subject for the custom area. The element is initially grayed-out, not present, or otherwise not selectable. The cropping module 215 calculates the size of the area selected as the subject in the manual and/or automatic selection modes, and makes the element selectable once the size of the area exceeds the threshold. In one embodiment, the threshold is 100 by 100 pixels, which represents the standard size of a sticker in the messaging system 130. Other embodiments use different size thresholds, or determine whether the threshold is met using different techniques (e.g., using a minimum percentage of the image).

Once the element is selected by the user, the cropping module 215 provides the image and cropping data to the drawing module 220. The drawing module 220 provides a UI that receives input from the user of the messaging application 112 to add optional custom content such as drawings, emojis and/or text to the cropped image. In one embodiment, the drawing module 220 accesses the cropping data associated with the image. The drawing module 220 displays the image with the cropping layer mask, where the portions of the cropping layer located directly above the portions identified by the cropping data as being the subject are fully transparent. Thus, the portions of the image containing the subject appear brighter or are otherwise distinguished relative to the other portions.

The drawing module 220 creates a drawing layer for the image above the cropping layer. The drawing module 220 then receives input for the custom content from the user and shows the custom content on the drawing layer. For example, the drawing module 220 may receive input describing drawings or text placed on top of the image. The added custom content may be located in a part of the image outside of the portion constituting the subject. The drawing module 220 saves drawing data describing the custom content in association with the image. Upon receiving an indication from the user that the drawing is complete, the drawing module 220 transmits the image, including the cropping and drawing data, to the custom sticker creation module 225.

The custom sticker creation module 225 receives the image and the associated data and processes the image to create a custom sticker. In one embodiment, the custom sticker creation module 225 crops the image according to the cropping data to create a cropped image. The cropped image includes only the portion of the image constituting the subject. In addition, the custom sticker creation module 225 combines the drawing data with the cropped image to produce a combined image. The custom content described by the drawing data is combined with the cropped image such that the custom content maintains a same position relative to the subject in the combined image. For example, if the custom content includes a line drawn adjacent to the subject, line remains in the same position adjacent to the subject in the modified image. Likewise, if the custom content includes text added over the subject, the modified image also includes the text in the same position. The extent of the combined image may thus exceed the boundary of the subject described by the cropping data because the custom content may be outside of the boundary. In one embodiment, the custom sticker creation module 225 makes transparent the portions of the combined image that are outside the boundary of the subject and do not contain any custom content. For example, the portion of the combined image between the subject and custom content adjacent to the subject is made transparent.

The custom sticker creation module 225 also resizes the combined image to a predetermined size. In one embodiment, the custom sticker creation module 225 scales the image to 100 by 100 pixels, which is a standard dimension for stickers in the messaging system 130. The resized combined image is a custom sticker. The custom sticker creation module 225 stores the custom sticker in the custom sticker store 230.

The custom sticker store 230 stores and maintains custom stickers for local access on the messaging application 112. The sticker selection interface module 235 provides an interface allowing a user of the messaging application 112 to view and select custom stickers stored in the custom sticker store 205. In one embodiment, the sticker selection interface module 235 generates a custom sticker interface as a part of a general sticker interface, wherein the general sticker interface is provided by the messaging application 112 to interact with stickers from the general sticker store 135. For example, the sticker selection interface module 235 may generate a custom sticker tab within the general sticker interface. The custom sticker tab then permits the user to access custom stickers saved locally to the custom sticker store 230.

In one embodiment, the custom sticker store 230 stores both the custom stickers and the various components used to create the custom stickers, including the unmodified source image and the cropping and drawing data. The sticker selection interface module 235 provides a UI element that allows the user to edit a custom sticker. In this case, the sticker selection interface module 235 provides the store image and data for the sticker to the cropping 215 and/or drawing 220 modules to allow the user to edit and re-save the custom sticker.

Figure 3:
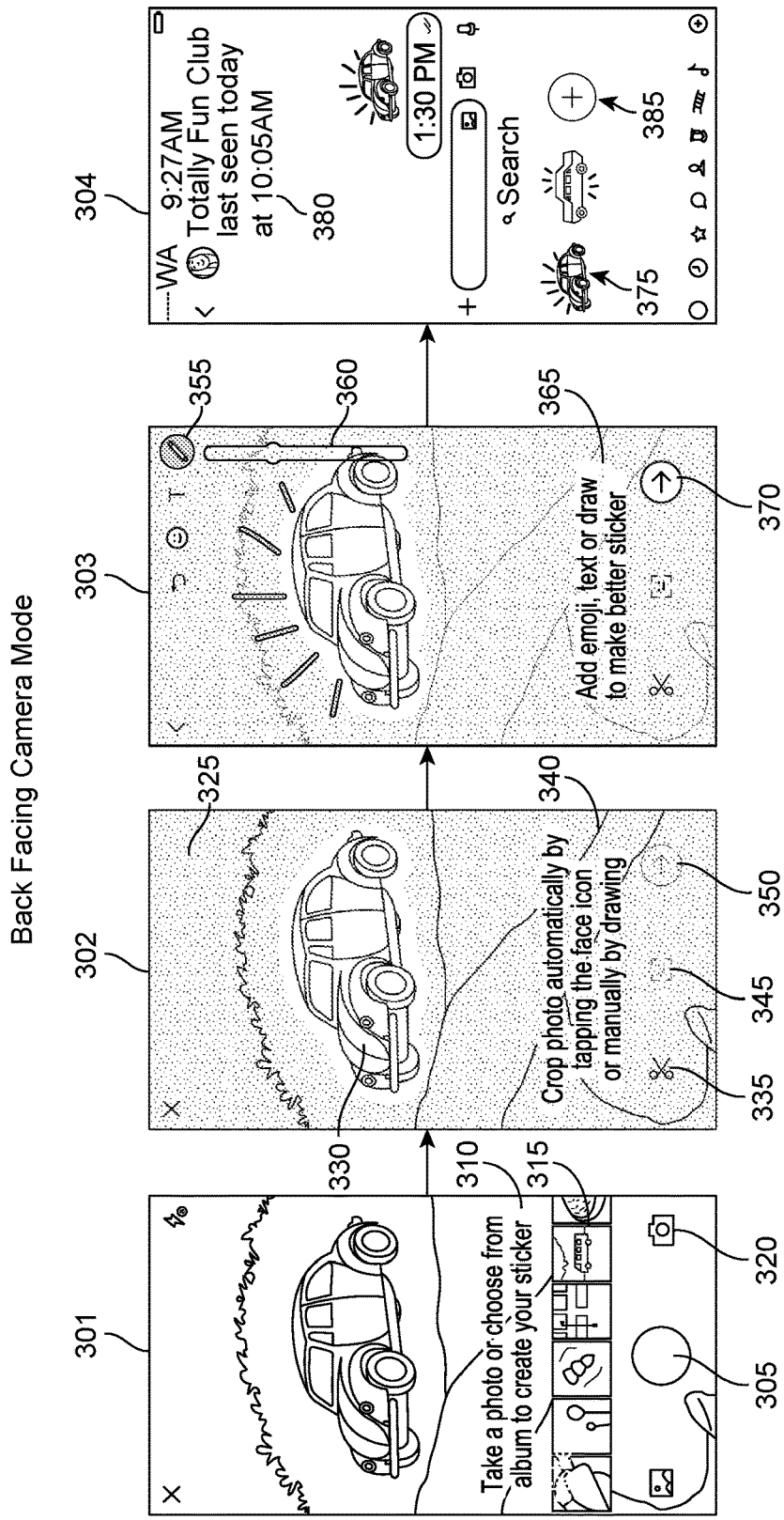
FIG. 3 is an example illustrating creating a custom sticker using a back facing camera mode, in accordance with an embodiment.

FIG. 3 is an example illustrating creating a custom sticker using a back facing camera mode according to one embodiment. The figure illustrates a progression of images showing sample UIs presented by the messaging application 112 on the display of the client device 110 while the custom sticker is created. The UIs may differ in other embodiments.

Upon receiving a request to create a custom sticker, the messaging application 112 provides an interface 301 including a button 305 to capture an image using the selected back facing camera. The interface 301 additionally includes a text instruction 310 to take a photo or to select an image from a local saved images store on the mobile device. As shown in the example of FIG. 3, a selection of images 315 from the local saved store is displayed for selection. The interface 301 also includes a button 320 to switch from the back facing camera to the front facing camera. In this example, the user of the messaging application 112 generates an image by taking a photo using the back facing camera. The remainder of the process illustrated in FIG. 3 would occur in the same manner if the user selected an image from among the locally-saved images.

The image is used as a base image for the custom sticker creation process. The messaging application 112 identifies the image source as the back facing camera of the client device 110 and provides an interface 302 allowing a user to provide input indicating a subject of the custom sticker. A cropping layer 325 is illustrated above the image and indicates non-selected areas of the sticker. As shown in FIG. 3, the selected area 330 indicating the subject for the custom sticker is indicated by removing the cropping mask 325 based on user input. The selection interface 302 may additionally include an icon 335 indicating a manual selection mode and an instruction 340 to the user of the messaging application 112. The selection interface 302 as shown in FIG. 3 also includes an icon 345 permitting the user to switch to an automatic facial recognition mode and a "next" button 350 indicating that the selection step is complete. As discussed above, the "next" button may be disabled until the size of the selected area 330 meets a threshold minimum area.

When a threshold minimum area is selected and the next button is selected, an interface 303 is presented for a drawing mode in which the user may add custom content to the custom sticker. The interface 303 shows the custom content on a drawing layer above the cropping layer and the image. The UI includes icons 355 allowing the user to select between emojis, text, and drawing. Each icon in the interface 303 is associated with additional options to customize the drawing process. For example, the selected drawing icon is associated with a color slider 360. The drawing mode interface 303 additionally includes an instruction 365 to the user of the messaging application 112 and a next button 370 to indicate completion of the custom content step.

Upon receiving an indication from the user that the custom content step is complete, the messaging application 112 crops, resizes, and stores the image as a custom sticker 375 accessible through the messaging interface. In other embodiments, other processing steps may occur prior to the image being stored as a custom sticker. The custom sticker 375 is then accessible via a custom sticker interface 304 in the messaging application 112. The user of the messaging application 112 can select the custom sticker 375 to send it to other users of the messaging system 130 on messaging threads 380. As shown in FIG. 3, the custom sticker interface 304 additionally includes an option 385 to create one or more additional custom stickers. In one embodiment, the custom sticker interface 304 allows users to modify previously created custom stickers.

Figure 4:
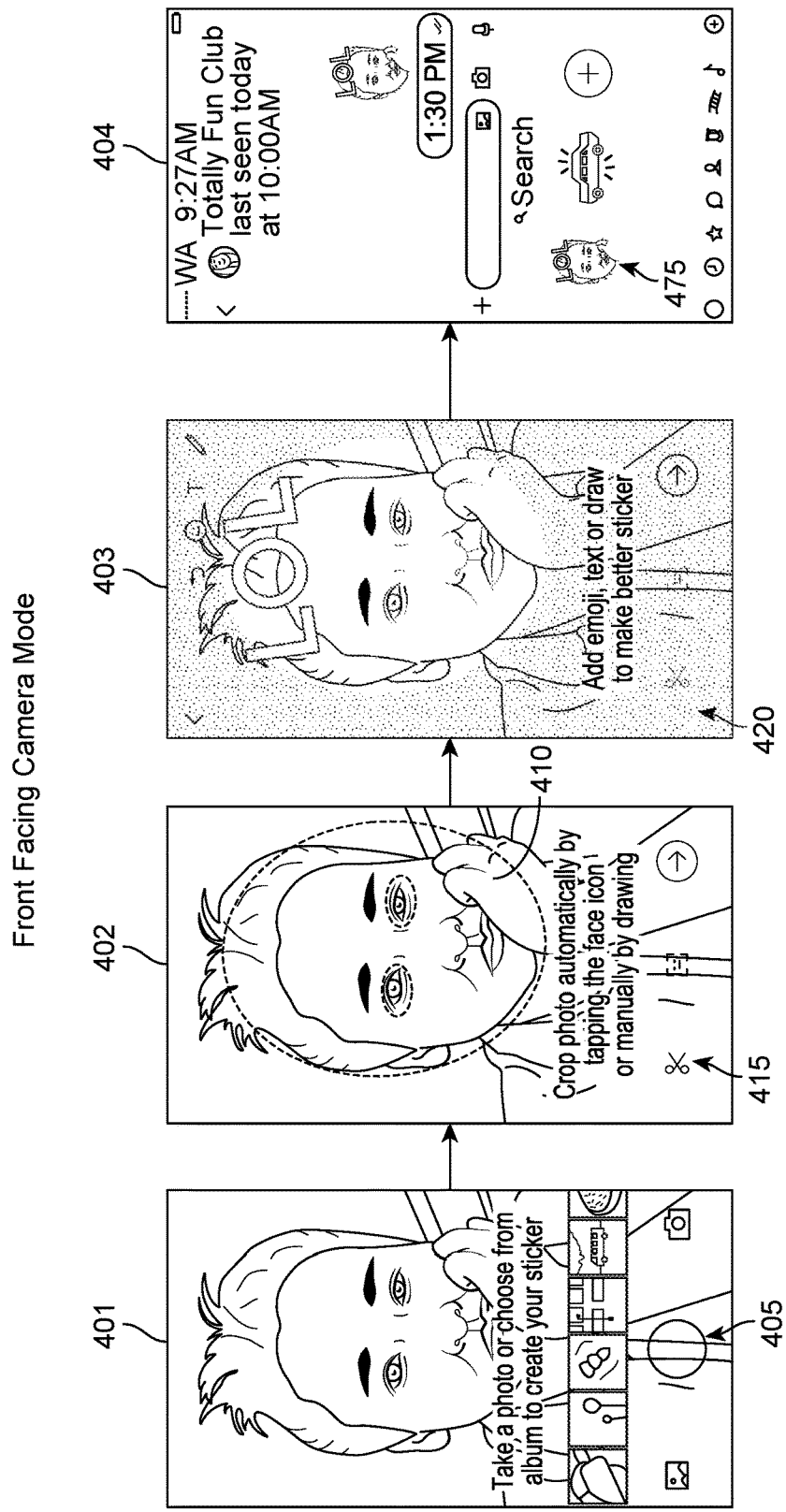
FIG. 4 is an example illustrating creating a custom sticker using a front facing camera mode, in accordance with an embodiment.

FIG. 4 is an example illustrating creating a custom sticker using a front facing camera mode according to one embodiment. The figure illustrates a progression of images showing sample UIs presented by the messaging application 112 on the display of the client device 110 while the custom sticker is created. The UIs may differ in other embodiments.

As previously discussed in association with FIG. 3, the messaging application 112 provides an interface 401 to the camera of the client device 110 including a button 405 to capture an image using the selected front facing camera. The interface 401 for capturing a photo using the front facing camera is otherwise similar to the interface 301 for capturing a photo using the back facing camera. Photos taken using the front facing camera are associated with a front facing camera image source.

Upon receiving an image from the front facing camera, the messaging application 112 generates the UI illustrated in an interface 402 for selecting, customizing, and processing the image to create a custom sticker. Based on the front facing camera image source, the messaging application 112 applies an automatic facial recognition process. The automatic facial recognition process identifies a face as the subject of the custom sticker. In one example, the identified area is first indicated using an outline 410. During the automatic facial recognition process step, the image does not include a cropping layer indicated by a mask applied to darken the non-selected areas of the image. The user is then able to accept the identified area or select to switch to a manual selection process using an icon 415.

When a selected area for the subject of the custom sticker is identified, the messaging application 112 provides an interface 403 that applies the partially-opaque mask 420 to indicate the non-selected area of the custom sticker and initiates a drawing mode. As described above in conjunction with FIG. 3, the drawing mode interface 403 allows users to add custom content to the custom sticker, including emojis, text, and drawings. Upon receiving an indication from the user that the custom content step is complete, the messaging application 112 crops, resizes, and stores the image as a custom sticker 425 accessible through the messaging interface. In other embodiments, other processing steps may occur prior to the image being stored as a custom sticker. The custom sticker 425 is then accessible via a custom sticker interface 404 in the messaging application 112. As previously discussed, the user of the messaging application 112 can select the custom sticker 425 to send it to other users of the messaging system 130, create one or more additional custom stickers, or modify previously created custom stickers via the custom sticker interface 404.

Figure 5:
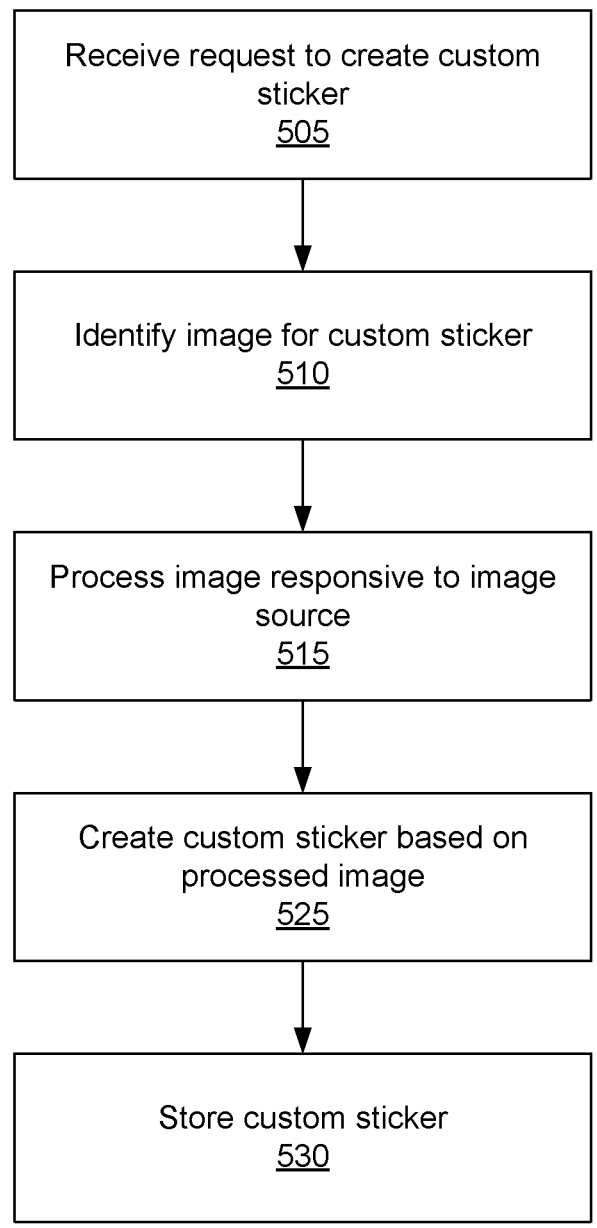
FIG. 5 is a flow chart illustrating a method of creating a custom sticker for use on the messaging system, in accordance with an embodiment.

FIG. 5 is a flowchart illustrating a method for creating a custom sticker for use on the messaging system 130 according to one embodiment. The steps of FIG. 5 may be performed by the messaging application 112. Some or all of the steps may be performed by other entities in other embodiments. In addition, other embodiments may include different and/or additional steps, and the steps may be performed in different orders.

The messaging application 112 receives 505 a request from a user of the messaging system 130 to create a custom sticker. Based on input from the user, the messaging application 112 identifies 510 an image for the custom sticker. The messaging application 112 processes 515 the identified image, the processing performed responsive to the source of the image. The messaging application 112 creates 525 the custom sticker based on the processed image and stores 530 the custom sticker locally such that, at a later point in time, the user of the client device 110 can access and send the custom sticker via the messaging system 130.

Figure 6:
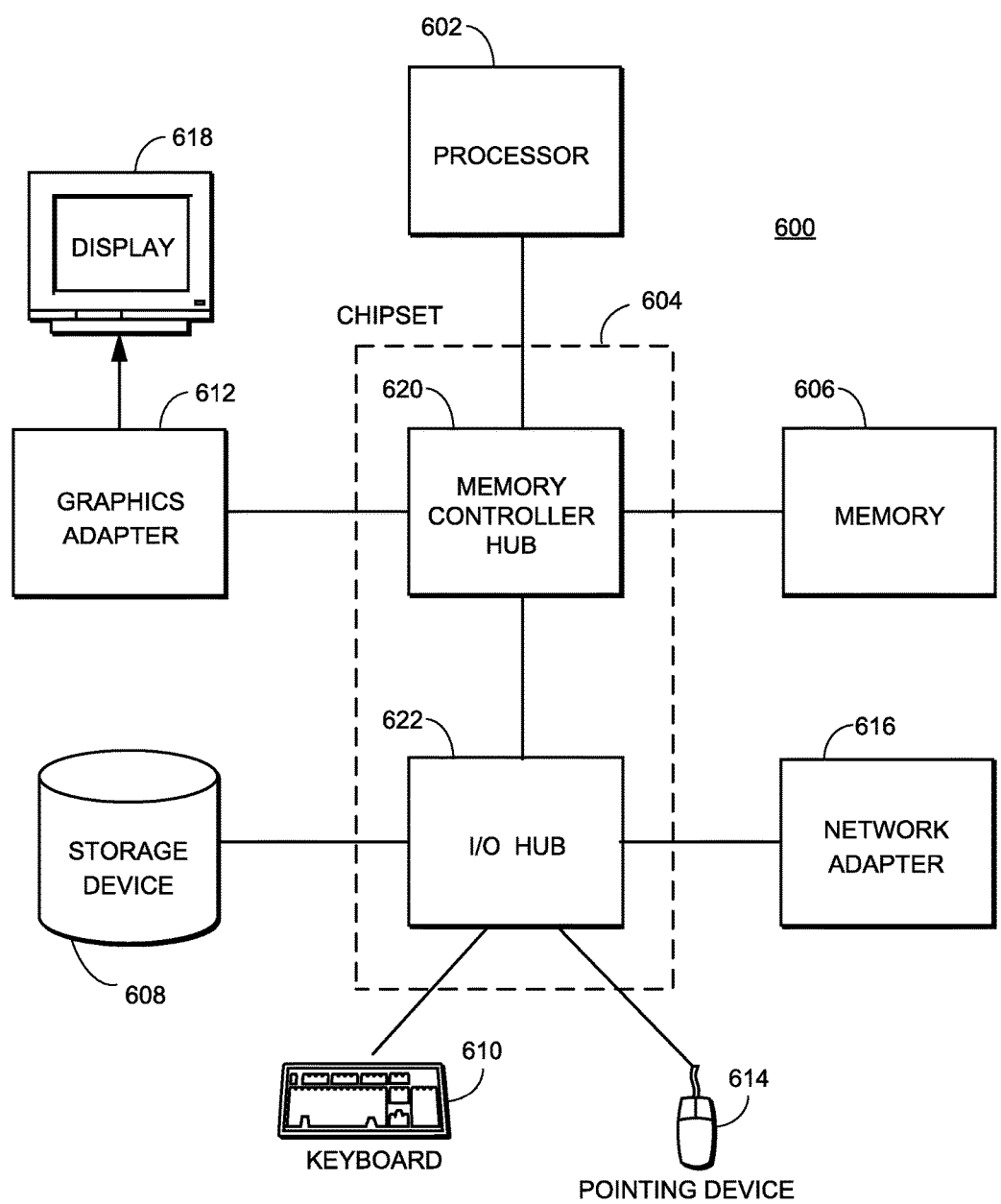
FIG. 6 is a high-level block diagram illustrating physical components of a computer used as part or all of one or more of the entities described herein, in accordance with an embodiment.

FIG. 6 is a high-level block diagram illustrating physical components of a computer 600 used as part or all of one or more of the entities described herein in one embodiment. For example, instances of the illustrated computer 600 may be used as a server operating the messaging system 130. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In another embodiment, the memory 606 is coupled directly to the processor 602 instead of the chipset 604. In one embodiment, one or more sound devices (e.g., a loudspeaker, audio driver, etc.) is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising: receiving a request from a client device to create a custom sticker; identifying a base image stored on the client device from which to create the custom sticker, the base image associated with metadata identifying an image capture source of the client device used to capture the base image; responsive to the base image being identified, processing the base image based on the to a source associated with the base image identified by the metadata, wherein the processing comprises selecting different image selection modes for different identified image capture sources of the client device; creating a custom sticker based on the processed base image; and storing the custom sticker in a sticker library from which the custom sticker can be selected for inclusion in a message sent by a messaging system.

2. The method of claim 1, wherein processing the base image based on the source associated with the base image identified by the metadata comprises: identifying, using the metadata, the image capture source of the base image as a front camera associated with the client device; responsive to identifying the image capture source of the base image as the front camera, automatically selecting, using facial recognition, an area of the base image; and cropping the base image using the selected area to produce a cropped image; wherein the custom sticker is created based on the cropped image.

3. The method of claim 1, wherein processing the base image based on the source associated with the base image identified by the metadata comprises: identifying, using the metadata, the image capture source of the base image as a back camera associated with the client device; responsive to identifying the image capture source of the base image as the back camera, activating a manual selection mode for the base image; receiving, from the client device, responsive to the manual selection mode, a user input selecting an area of the base image; and cropping the base image using the selected area to form a cropped image; wherein the custom sticker is created based on the cropped image.

4. The method of claim 3, the processing further comprising: presenting, on a display of the client device, a disabled user interface (UI) element for moving to a next step associated with creating the custom sticker; calculating a size of the selected area of the base image; and enabling the UI element responsive to the size of the selected area of the base image exceeding a threshold area size.

5. The method of claim 3, the processing further comprising: presenting the base image on a display of the client device; presenting a cropping layer over the base image on the display of the client device, the cropping layer including a partially-transparent mask; and responsive to the user input selecting an area of the base image, changing a portion of the cropping layer located above the selected area to make the portion more transparent than portions of the cropping layer located above non-selected areas of the base image.

6. The method of claim 1, wherein processing the base image based on the source associated with the base image identified by the metadata comprises: providing a user interface (UI) on a display of the client device showing the base image with a cropping layer overlaid over the base image that distinguishes a selected portion of the base image from other portions; receiving input from a user of the client device via the UI, the input adding custom content; and displaying the custom content on the UI, the custom content displayed on a drawing layer overlaid on the cropping layer; wherein the custom sticker is created responsive to the custom content.

7. The method of claim 1, wherein creating the custom sticker based on the processed base image comprises: cropping the base image responsive to cropping data describing an area of the base image containing a subject for the custom sticker to produce a cropped image; combining the cropped image with drawing data describing custom content provided by a user of the client device to produce a modified image; and resizing the combined image to a predetermined size to produce the custom sticker.

8. The method of claim 1, wherein processing the base image responsive to a source associated with the base image comprises: determining whether the source associated with the base image is a front camera or a rear camera associated with the client device; responsive to determining that the source associated with the base image is the front camera, automatically selecting an area of the base image; and responsive to determining that the source associated with the base image is the back camera, activating a manual selection mode for the base image.

9. The method of claim 1, wherein storing the custom sticker in the sticker library comprises: storing, in association with the custom sticker in the sticker library, the base image and processing data describing processing performed on the base image to create the custom sticker; providing a user interface (UI) element on a display of the client device allowing a user of the client device to edit the custom sticker; and responsive to selection of the UI element by the user, using the base image and the processing data to edit the custom sticker.

10. A non-transitory computer-readable storage medium storing computer program instructions executable by a processor to perform operations comprising: receiving a request from a client device to create a custom sticker; identifying a base image stored on the client device from which to create the custom sticker, the base image associated with metadata identifying an image capture source of the client device used to capture the base image; responsive to the base image being identified, processing the base image based on the source associated with the base image identified by the metadata, wherein the processing comprises selecting different image selection modes for different identified image capture sources of the client device; creating a custom sticker based on the processed base image; and storing the custom sticker in a sticker library from which the custom sticker can be selected for inclusion in a message sent by a messaging system.

11. The computer-readable storage medium of claim 10, wherein processing the base image based on the source associated with the base image identified by the metadata comprises: identifying, using the metadata, the image capture source of the base image as a front camera associated with the client device; responsive to identifying the image capture source of the base image as the front camera, automatically selecting, using facial recognition, an area of the base image; and cropping the base image using the selected area to produce a cropped image; wherein the custom sticker is created based on the cropped image.

12. The computer-readable storage medium of claim 10, wherein processing the base image based on the source associated with the base image identified by the metadata comprises: identifying, using the metadata, the image capture source of the base image as a back camera associated with the client device; responsive to identifying the image capture source of the base image as the back camera, activating a manual selection mode for the base image; receiving, from the client device, responsive to the manual selection mode, a user input selecting an area of the base image; and cropping the base image using the selected area to form a cropped image; wherein the custom sticker is created based on the cropped image.

13. The computer-readable storage medium of claim 12, the processing further comprising: presenting, on a display of the client device, a disabled user interface (UI) element for moving to a next step associated with creating the custom sticker; calculating a size of the selected area of the base image; and enabling the UI element responsive to the size of the selected area of the base image exceeding a threshold area size.

14. The computer-readable storage medium of claim 12, the processing further comprising: presenting the base image on a display of the client device; presenting a cropping layer over the base image on the display of the client device, the cropping layer including a partially-transparent mask; and responsive to the user input selecting an area of the base image, changing a portion of the cropping layer located above the selected area to make the portion more transparent than portions of the cropping layer located above non-selected areas of the base image.

15. The computer-readable storage medium of claim 10, wherein processing the base image based on the source associated with the base image identified by the metadata comprises: providing a user interface (UI) on a display of the client device showing the base image with a cropping layer overlaid over the base image that distinguishes a selected portion of the base image from other portions; receiving input from a user of the client device via the UI, the input adding custom content; and displaying the custom content on the UI, the custom content displayed on a drawing layer overlaid on the cropping layer; wherein the custom sticker is created responsive to the custom content.

16. The computer-readable storage medium of claim 10, wherein creating the custom sticker based on the processed base image comprises: cropping the base image responsive to cropping data describing an area of the base image containing a subject for the custom sticker to produce a cropped image; combining the cropped image with drawing data describing custom content provided by a user of the client device to produce a modified image; and resizing the combined image to a predetermined size to produce the custom sticker.

17. A system comprising: a computer processor for executing computer program instructions; and a non-transitory computer-readable storage medium storing computer program instructions executable by the processor to perform operations comprising: receiving a request from a client device to create a custom sticker; identifying a base image stored on the client device from which to create the custom sticker, the base image associated with metadata identifying an image capture source of the client device used to capture the base image; responsive to the base image being identified, processing the base image based on the source associated with the base image identified by the metadata, wherein the processing comprises selecting different image selection modes for different identified image capture sources of the client device; creating a custom sticker based on the processed base image; and storing the custom sticker in a sticker library from which the custom sticker can be selected for inclusion in a message sent by a messaging system.

18. The system of claim 17, wherein processing the base image based on the source associated with the base image identified by the metadata comprises: identifying, using the metadata, the image capture source of the base image as a front camera associated with the client device; responsive to identifying the image capture source of the base image as the front camera, automatically selecting, using facial recognition, an area of the base image; and cropping the base image using the selected area to produce a cropped image; wherein the custom sticker is created based on the cropped image.

19. The system of claim 17, wherein processing the base image based on the source associated with the base image identified by the metadata comprises: identifying, using the metadata, the image capture source of the base image as a back camera associated with the client device; responsive to identifying the image capture source of the base image as the back camera, activating a manual selection mode for the base image; receiving, from the client device, responsive to the manual selection mode, a user input selecting an area of the base image; and cropping the base image using the selected area to form a cropped image; wherein the custom sticker is created based on the cropped image.

20. The system of claim 19, the processing further comprising: presenting, on a display of the client device, a disabled user interface (UI) element for moving to a next step associated with creating the custom sticker; calculating a size of the selected area of the base image; and enabling the UI element responsive to the size of the selected area of the base image exceeding a threshold area size.

21. The system of claim 19, the processing further comprising: presenting the base image on a display of the client device; presenting a cropping layer over the base image on the display of the client device, the cropping layer including a partially-transparent mask; and responsive to the user input selecting an area of the base image, changing a portion of the cropping layer located above the selected area to make the portion more transparent than portions of the cropping layer located above non-selected areas of the base image.

* * * * *

UNITED STATES PATENT AND TRADEMARK OFFICE
CERTIFICATE OF CORRECTION

PATENT NO. : 10,269,164 B1
APPLICATION NO. : 15/993533
DATED : April 23, 2019
INVENTOR(S) : Min Seung Song and Randall Sarafa It is certified that error appears in the above-identified patent and that said Letters Patent is hereby corrected as shown below:

In the Claims

Column 10, Line 13, Claim 1, delete "the base image based on the to a source" and insert -- the base image based on the source --.

Signed and Sealed this
Twenty-second Day of October, 2019

Andrei Iancu
*Director of the United States Patent and Trademark Office*